United States Patent
Koba

(10) Patent No.: US 8,505,693 B2
(45) Date of Patent: Aug. 13, 2013

(54) ELEVATOR SYSTEM AND GROUP MANAGEMENT CONTROL DEVICE TO IMPROVE ELEVATOR AVAILABILITY FOR DISABLED PERSONS

(75) Inventor: Yoshimasa Koba, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 273 days.

(21) Appl. No.: 12/992,104

(22) PCT Filed: May 21, 2008

(86) PCT No.: PCT/JP2008/059332
§ 371 (c)(1),
(2), (4) Date: Nov. 11, 2010

(87) PCT Pub. No.: WO2009/141901
PCT Pub. Date: Nov. 26, 2009

(65) Prior Publication Data
US 2011/0061977 A1    Mar. 17, 2011

(51) Int. Cl.
*B66B 1/18* (2006.01)
(52) U.S. Cl.
USPC ............................ 187/387; 187/901; 187/391
(58) Field of Classification Search
USPC .................................. 187/247, 380–399, 901
See application file for complete search history.

(56) References Cited

U.S. PATENT DOCUMENTS

| | | | |
|---|---|---|---|
| 4,989,694 A * | 2/1991 | Ueshima et al. | 187/380 |
| 5,192,836 A * | 3/1993 | Schroder | 187/384 |
| 6,152,265 A * | 11/2000 | Bittar et al. | 187/384 |
| 6,828,918 B2 * | 12/2004 | Bowman et al. | 340/4.1 |
| 6,902,041 B2 * | 6/2005 | Eccleston | 187/380 |
| 6,986,408 B2 * | 1/2006 | Takeuchi | 187/380 |
| 7,377,364 B2 * | 5/2008 | Tyni et al. | 187/380 |
| 8,047,333 B2 * | 11/2011 | Finschi | 187/382 |

(Continued)

FOREIGN PATENT DOCUMENTS

| | | |
|---|---|---|
| CN | 1926042 A | 3/2007 |
| CN | 101054139 A | 10/2007 |

(Continued)

OTHER PUBLICATIONS

International Search Report issued Feb. 17, 2009 in PCT/JP08/059332 filed May 21, 2008.

(Continued)

*Primary Examiner* — Anthony Salata
(74) *Attorney, Agent, or Firm* — Oblon, Spivak, McClelland, Maier & Neustadt, L.L.P.

(57) ABSTRACT

In an elevator system, an elevator-hall-call/destination-floor-call registration device provided at an elevator hall includes, besides a destination floor registration button such as a numeric keypad, etc. formed by buttons having respective numbers of 0 to 9 for registering a destination floor, a disabled person button declaring that a customer is a disabled person. For example, in the elevator-hall-call/destination-floor-call registration device, when the disabled person button is pressed and the destination floor call is inputted, a group management control device registers the destination floor call, and determines a car to be assigned for the destination floor call, rings a chime and further turns on a hall lantern corresponding to the determined assigned car. Like the above, the group management control device rings the chime and turns on the hall lantern only when the disabled person button is pressed.

6 Claims, 5 Drawing Sheets

(56) References Cited

U.S. PATENT DOCUMENTS

| | | | |
|---|---|---|---|
| 8,136,636 B2* | 3/2012 | Bahjat et al. | 187/391 |
| 8,316,997 B2* | 11/2012 | Mitsuda et al. | 187/384 |
| 2011/0168499 A1* | 7/2011 | Takeuchi | 187/389 |
| 2012/0168262 A1* | 7/2012 | Finschi | 187/392 |
| 2012/0175195 A1* | 7/2012 | Koba | 187/382 |

FOREIGN PATENT DOCUMENTS

| | | |
|---|---|---|
| JP | 59 057873 | 4/1984 |
| JP | 63-202577 | 8/1988 |
| JP | 04 226286 | 8/1992 |
| JP | 2000 191247 | 7/2000 |
| JP | 2000 272850 | 10/2000 |
| JP | 2003 267637 | 9/2003 |
| JP | 2004 238113 | 8/2004 |
| JP | 2006 151535 | 6/2006 |

OTHER PUBLICATIONS

Office Action issued Nov. 21, 2012 in Chinese Patent Application No. 200880129243.8 (with English translation).

Office Action issued Jan. 8, 2013 in Japanese Patent Application No. 2010-512883 (with English-language translation).

Japanese Office Action with Partial English Translation (2010-512883) dated Jun. 4, 2013.

* cited by examiner

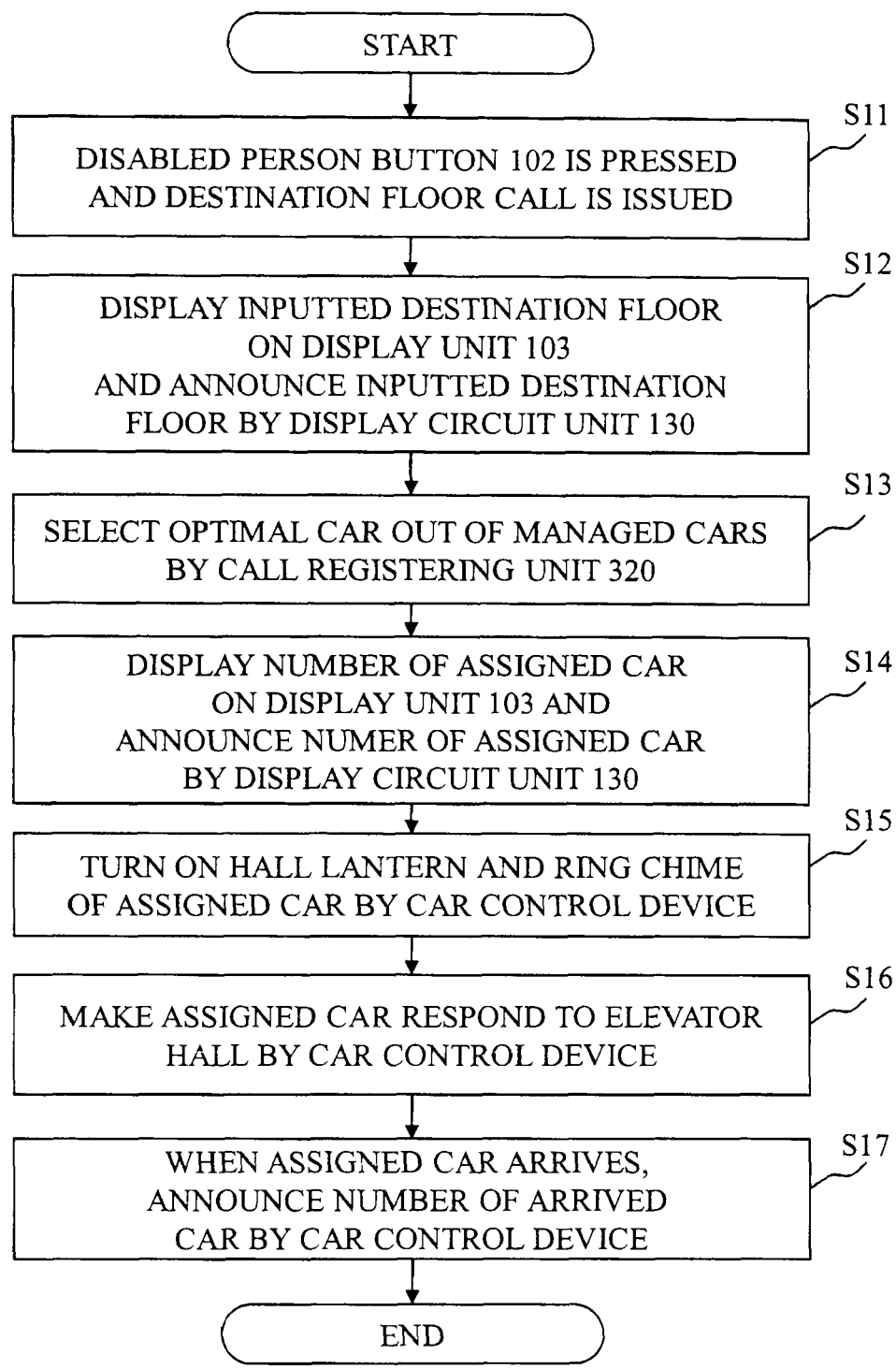

ELEVATOR SYSTEM AND GROUP MANAGEMENT CONTROL DEVICE TO IMPROVE ELEVATOR AVAILABILITY FOR DISABLED PERSONS

TECHNICAL FIELD

The present invention relates to an elevator system and a group management control device to improve availability of an elevator by a disabled person.

BACKGROUND ART

When plural elevators are provided in a building, a group management control device of an elevator system selects a car to assign passengers according to destination floors out of plural cars and assigns the passengers to reduce the waiting time of the passengers and to reduce the time for completing transportation of the passengers to the destination floors.

An elevator hall display device disclosed in Patent document 1 includes means to register a destination floor call of a passenger as well as an elevator hall call at an elevator hall; and when the destination floor call is registered, a group management device selects an optimal car for responding, turns on a hall lantern corresponding to the selected car to forecast, and as well displays a number of an assigned car on a destination-floor-call registration device at the elevator hall.
Patent document 1: JP2000-272850A

DISCLOSURE OF THE INVENTION

Problems to be Solved by the Invention

In a conventional elevator system, the hall lantern is turned on each time when the destination floor call is inputted from a certain elevator hall, and it is difficult for customers assigned to the second or third car to determine which car to ride on among the cars whose hall lanterns are lighting.

Further, when many cars are assigned, the number, corresponding to the number of assigned cars, of hall lanterns are to be turned on, which requires much electrical capacity.

The present invention aims to solve the above problems by guiding, among the customers, only a customer who needs guidance more such as a disabled person by the hall lantern.

Means to Solve the Problems

According to the present invention, an elevator system includes:

a call receiving device provided at an elevator hall having a destination floor receiving unit receiving a destination floor call for an elevator and a disabled-person-declaration receiving unit, when operated, receiving a declaration of being a disabled person and outputting a disabled person signal showing to be the disabled person; and a group management control device registering the destination floor call received by the destination floor receiving unit, and as well, if the disabled person signal is outputted by the disabled-person-declaration receiving unit when the destination floor call is received by the destination floor receiving unit, determining an elevator car to be assigned for the destination floor call registered out of a plurality of elevator cars, and further operating a notifying device notifying of determined assignment of the elevator car provided corresponding to a door of the elevator car determined at an elevator hall side which is the door of the elevator hall at the elevator hall side at which the call receiving device is provided.

The group management control device registering the destination floor call received by the destination floor receiving unit, and as well, if the disabled person signal is outputted by the disabled person declaration receiving unit when the destination floor call is received by the destination floor receiving unit, if the disabled person signal is outputted by the disabled-person-declaration receiving unit, determines the elevator car to be assigned for the destination floor call registered out of at least one elevator car for a disabled person's use which has been previously set as the disabled person's use.

The notifying device is a sound generating device generating predetermined sound as the notice.

The notifying device is a light emitting device emitting light as the notice.

The notifying device is a display device displaying predetermined information as the notice.

According to the present invention, a group management control device includes:

an inputting unit inputting a destination floor call and a disabled person signal from a call receiving device provided at an elevator hall and having a destination floor receiving unit receiving and outputting the destination floor call for an elevator and a disabled-person-declaration receiving unit, when operated, receiving a declaration of being a disabled person and outputting the disabled person signal showing to be the disabled person; and a call registering unit registering the destination floor call inputted by the inputting unit, and as well, if the disabled person signal is inputted when the destination floor call is inputted, determining an elevator car to be assigned for the destination floor call registered out of a plurality of elevator cars, and further operating a notifying device notifying of determined assignment of the elevator car provided corresponding to a door of the elevator car determined at an elevator hall side which is the door of the elevator hall at the elevator hall side at which the call receiving device is provided.

Effect of the Invention

According to the present invention, a disabled person can distinguish immediately a car to ride on, and can move to the car to ride on smoothly. Further, since the hall lantern is turned on only for the disabled person, it is possible to reduce electrical capacity for lighting.

BEST MODE FOR CARRYING OUT THE INVENTION

Embodiment 1

FIG. 1 is a diagram showing an example of hardware resource of an elevator-hall-call/destination-floor-call registration device 100A or a group management control device 300 of an elevator system 1000 according to the first embodiment. Here, an elevator-hall-call/destination-floor-call registration device 100B which will be discussed later has the same hardware configuration with the elevator-hall-call/destination-floor-call registration device 100A. The elevator-hall-call/destination-floor-call registration device 100A and the group management control device 300 are computers having hardware resource shown in FIG. 1. Hereinafter, FIG. 1 explains the group management control device 300; the explanation of the group management control device 300 is also applied to the elevator-hall-call/destination-floor-call registration device 100A.

In FIG. 1, the group management control device 300 includes a CPU 810 (Central Processing Unit) executing programs. The CPU 810 is connected via a bus 825 to a ROM (Read Only Memory) 811, a RAM (Random Access Memory) 812, a display unit 813, an operation key 814, a communication board 816, and a magnetic disk drive 820, and controls these hardware devices. Instead of the magnetic disk drive 820, it can be connected to a memory device such as a flash memory, etc. Here, FIG. 1 shows one of examples, and the group management control device 300 can be configured not to include the display device 813 or the operation key 814. However, in case of the elevator-hall-call/destination-floor-call registration device 100A, the display device 813 (a display circuit unit 130 which will be discussed later), the operation key 814 (corresponding to a destination floor registration button 101 and a disabled person button 102) are included.

The RAM 812 is an example of a volatile memory. Storage medium of the ROM 811 and the magnetic disk drive 820, etc. are examples of a non-volatile memory. These are examples of a memory device or a memory unit.

The communication board 816, the operation key 814, etc. are examples of an inputting unit and an inputting device. Further, the communication board 816 and the display device 813, etc. are examples of an outputting unit and an outputting device.

The communication board 816 is connected to a network. The elevator-hall-call/destination-floor-call registration device 100A, the group management control device 300, the car control devices 200A and 200B which will be discussed later (the car control device is also called as an each car control device) are connected via the network, and can conduct information communication mutually.

The magnetic disk drive 820 stores an operating system 821 (OS), programs 822, and files 823. Programs of the programs 822 are executed by the CPU 810 and the operating system 821.

The above programs 822 store programs executing functions explained in the embodiment that will be discussed in the following as "-- unit". The programs are read and executed by the CPU 810.

The files 823 store information explained in the following embodiment as "determined result of --", "computed result of --", "extracted result of --", "generated result of --", "processed result of --" as each item of "--file" or "-- database", data, signal values, variable values, or parameters. "-- file" or "-- database" is stored in the recording medium such as disks or memories, etc. The information, data, signal values, variable values, or parameters stored in the storage medium such as disks or memories, etc. are read by the CPU 810 via the reading/writing circuit to a main memory or a cache memory, and used for the operation of the CPU such as extraction, search, reference, comparison, operation, calculation, processing, output, and display, etc. During the operation of the CPU of extraction, search, reference, comparison, operation, calculation, processing, output, and display, the information, data, signal values, variable values, or parameters is temporarily stored in the main memory, the cache memory, or a buffer memory, etc.

Further, a component explained as "-- unit" in the following embodiment can be "-- means", "-- device", "-- circuit", or "-- equipment", and can be also "-- step", "-- procedure", or "-- process". That is, the component explained as "-- unit" can be implemented by the firmware stored in the ROM 811. Or it is also possible to implement only by software, only by hardware such as elements, devices, boards, and wirings, etc., or a combination of software and hardware, and a combination further with firmware. The programs are read by the CPU 810, and executed by the CPU 810. That is, the programs are to function a computer as "-- unit" which will be discussed later.

FIG. 2 shows a system configuration of the elevator system 1000 according to the first embodiment. In FIG. 2, car control devices 200A and 200B for respectively controlling cars 250A and 250B and the elevator-hall-call/destination-floor-call registration devices 100A and 100B (a call receiving device) provided at the elevator hall are connected via the network 700 to the group management control device 300. Here, FIG. 2 shows two car control devices and two elevator-hall-call/destination-floor-call registration devices, which is shown as an example. The elevator-hall-call/destination-floor-call registration device and the car control device, etc. can be plural such as two or more.

In the elevator system 1000 according to the first embodiment, the elevator-hall-call/destination-floor-call registration device which is provided at the elevator hall includes a disabled person button 102 for declaring to be a disabled person besides a destination floor registration button 101 such as numeric keypad, etc. configured by buttons having respective numbers of 0 to 9 for registering the destination floor. Then, the group management control device 300 for managing plural cars is configured to issue a lighting instruction of hall lantern or a ringing instruction of chime corresponding to each car only when the disabled person button 102 is pressed (only when the declaration of being the disabled person is made).

(Car Control Device 200A)

Car control devices 200A and 200B are provided for the cars 250A and 250B, respectively, connected to hall lanterns 400A and 400B (an example of a lighting device) or chimes 500A and 500B (an example of a sound generating device) corresponding to the respective cars 250A and 250B, and control respective connected equipments under control of the group management control device 300. The hall lantern or the chime is an example of a notifying device to notify the disabled person of the car to ride on. As shown in FIG. 2, at the elevator hall which is provided with the elevator-hall-call/destination-floor-call registration devices 100A and 100B, the hall lantern and the chime corresponding to respective cars are provided around doors of the cars at the elevator hall side. Further, car number display plates 260A and 260B showing car numbers are provided.

(Elevator-Hall-Call/Destination-Floor-Call Registration Device 100A)

In FIG. 3, (a) shows an outer appearance of the elevator-hall-call/destination-floor-call registration device 100A, which is an enlarged view of the elevator-hall-call/destination-floor-call registration device 100A of FIG. 2. In FIG. 3, (b) is a block diagram showing main configurational elements of the elevator-hall-call/destination-floor-call registration device 100A. The elevator-hall-call/destination-floor-call registration device 100B has the same configuration with the elevator-hall-call/destination-floor-call registration device 100A. As shown in (a) of FIG. 3, the elevator-hall-call/destination-floor-call registration device 100A (also called as an elevator hall operation board) includes the destination floor registration button 101 such as numeric keypad, etc. configured by buttons having respective numbers of 0 to 9 as an elevator hall inputting means by which the destination floor call can be registered at the elevator hall, a disabled person button 102 for declaring a customer to be a disabled person, and a display unit 103 which is, for example, a liquid crystal display unit showing the inputted destination floor and the number of the assigned car. The elevator-hall-call/destination-floor-call registration device 100A sends information of the destination floor inputted by the destination floor registration button 101 and information showing the presence or absence of press of the disabled person button 102 to the group management control device 300. The group management control device 300 determines assignment of cars based on the above information sent from the elevator-hall-call/destination-floor-call registration device 100A and sends the car assignment information to the elevator-hall-call/destination-floor-call registration device 100A.

As shown in (b) of FIG. 3, the elevator-hall-call/destination-floor-call registration device 100A includes a destination floor receiving unit 110, a disabled-person-declaration receiving unit 120, a display circuit unit 130, and a communication unit 140.

(1) The destination floor receiving unit 110 includes a destination floor registration button 101. The destination floor receiving unit 110 receives a destination floor call (a destination floor) for the elevator via the destination floor registration button 101.

(2) The disabled-person-declaration receiving unit 120 includes a disabled person button 102. The disabled-person-declaration receiving unit 120, when the disabled person button 102 is pressed (operated), receives a declaration being a disabled person and outputs a disabled person signal showing a disabled person.

(3) The display circuit unit 130 includes a display unit 103. The display circuit unit 130 displays predetermined information on the display unit 103.

(4) The communication unit 140 communicates with the group management control device 300.

(Group Management Control Device 300)

As shown in FIG. 2, the group management control device 300 includes a call detecting unit 310 (the inputting unit) having a disabled person detecting unit 311, and a call registering unit 320 having an assignment-evaluated-value computing unit 321 and a car assignment determining unit 322. The call detecting unit 310 detects a call from the elevator-hall-call/destination-floor-call registration device 100A or the elevator-hall-call/destination-floor-call registration device 100B. At this time, the disabled person detecting unit 311, when the call (the destination floor call) is detected, detects whether the disabled person button 102 is pressed or not. The call detecting unit 310 outputs the detected call, and when "the disabled person button 102 is pressed" is detected by the disabled person detecting unit 311, information showing "the disabled person button 102 is pressed" to the assignment-evaluated-value computing unit 321.

The assignment-evaluated-value computing unit 321 computes an evaluated value of all cars 250A and 250B which are cars to be assigned for calls inputted by the call detecting unit 310. The assignment-evaluated-value computing unit 321 outputs the evaluated value of the car 250A and the car 250B obtained by the result of computation to the car assignment determining unit 322. The computation of the evaluated value belongs to the conventional technique.

The car assignment determining unit 322 compares respective evaluated values of the cars 250A and 250B inputted from the assignment-evaluated-value computing unit 321 and determines the optimal car. The car assignment determining unit 322 sends a car responding instruction to make the car to be assigned respond and, when "the disabled person button 102 is pressed" is detected, a signal to instruct lighting the hall lantern and a signal to instruct ringing the chime to the car control device 200A or the car control device 200B corresponding to the determined assigned car. The car assignment determining unit 322 sends an assigned-car-number displaying instruction to display the assigned car number to the elevator-hall-call/destination-floor-call registration device 100A (or the elevator-hall-call/destination-floor-call registration device 100B) at which the destination floor is inputted. On receiving the assigned-car-number displaying instruction, the elevator-hall-call/destination-floor-call registration device displays the assigned car number on the display unit 103.

(Explanation of the Operation)

FIG. 4 is a flowchart showing a processing flow of the elevator system 1000. The operation will be explained according to the flowchart of FIG. 4. In the following explanation of the operation, although the explanation will be done using a case in which the elevator-hall-call/destination-floor-call registration device 100A is operated, the operation is the same when the elevator-hall-call/destination-floor-call registration device 100B is operated. In the following explanation, it is assumed that the destination floor call is inputted from the elevator-hall-call/destination-floor-call registration device 100A, and the group management control device 300 determines to assign "the car 250B" for this input.

(Elevator-Hall-Call/Destination-Floor-Call Registration Device 100A)

When the destination floor is inputted from the destination floor registration button 101 of the elevator-hall-call/destination-floor-call registration device 100A at the elevator hall, the destination floor receiving unit 110 issues a destination floor call corresponding to the inputted destination floor (S1).

When the destination floor call is issued, the display circuit unit 130 displays the destination floor inputted from the destination floor registration button 101 on the display unit 103 (S2).

The disabled-person-declaration receiving unit 120 inputs the destination floor, and at the same time detects the presence or absence of pressing the disabled person button 102 (S3), and outputs the detected result as "information showing the presence or absence of pressing the disabled person button 102" (disabled person information, hereinafter). When the disabled person button 102 is pressed, the disabled-person-declaration receiving unit 120 detects "the disabled person button 102 is pressed", and outputs "information showing that the disabled person button 102 is pressed" (an example of a disabled person signal) as the disabled person information. The communication unit 140 transmits "destination-floor-call information" and the "disabled person information" to the group management control device 300 via the network 700.

(Group Management Control Device 300)

The call detecting unit 310 receives the "destination-floor-call information" and the "disabled person information" via the network 700. The call detecting unit 310 detects a destination floor call from the received "destination-floor-call information". Further, the disabled person detecting unit 311 detects presence or absence of pressing the disabled person button 102 from the received "disabled person information". When "the disabled person button 102 is pressed" is detected together with the detected call (the destination floor call) by the disabled person detecting unit 311, the call detecting unit 310 outputs information of "the disabled person button 102 is pressed" to the assignment-evaluated-value computing unit 321. The assignment-evaluated-value computing unit 321 registers the destination floor call, and for all the cars 250A and 250B which are cars to be assigned, computes evaluated values for the call inputted by the call detecting unit 310. The assignment-evaluated-value computing unit 321 outputs the evaluated values of the car 250A and the car 250B obtained by the computed result to the car assignment determining unit 322.

The car assignment determining unit 322 selects the optimal car out of the managed cars based on the evaluated values. At this time, when cars for the disabled person's use are separated from cars for the able-bodied person among the cars, the car assignment determining unit 322 selects the optimal car from the cars for the disabled person's use (S4). Namely, when the destination floor receiving unit 110 receives the destination floor call, and if the disabled person signal is outputted from the disabled-person-declaration receiving unit 120, the car assignment determining unit 322 determines an elevator car to be assigned for the registered destination floor call from at least one elevator car for the disabled person's use which has been preset for the disabled person's use. In this example, it is assumed that the car assignment determining unit 322 determines the car 250B.

The car assignment determining unit 322 sends the number 250B of the determined assigned car to the elevator-hall-call/destination-floor-call registration device 100A to which the destination floor call is inputted.

The communication unit 140 of the elevator-hall-call/destination-floor-call registration device 100A receives the number 250B of the car. The display circuit unit 130 displays the number 250B of the car (the assigned car) received by the communication unit 140 on the display unit 103 (S5).

Further, the car assignment determining unit 322 sends a hall lantern lighting instruction to instruct to turn on the hall lantern 400B and a chime ringing instruction to instruct to ring the chime 500B to the car control device 200B which controls the determined assigned car 250B. The car control device 200B turns on the hall lantern 400B corresponding to the car 250B and as well rings the chime 500B corresponding to the car 250B (S6). The car assignment determining unit 322 sends additionally a "car responding instruction" to the car control device 200B to make the car 250B respond to the floor at which the destination floor call is registered (S7).

The car assignment determining unit 322, when the pressing of the disabled person button 102 is not detected by the disabled person detecting unit 311 at the time of inputting the destination floor call, promptly selects (determines) the optimal car out of the managed cars (S8), and sends the number of the determined assigned car to the elevator-hall-call/destination-floor-call registration device 100A to which the destination floor call is inputted. Also in this case, it is assumed that the car assignment determining unit 322 determines the car 250B.

The communication unit 140 of the elevator-hall-call/destination-floor-call registration device 100A receives the number 250B of the car. The display circuit unit 130 displays the number 250B of the car received by the communication unit 140 on the display unit 103 (S9).

The car assignment determining unit 322, when the disabled person information of "the disabled person button 102 is pressed" is not inputted from the call detecting unit 310, does not send the hall lantern lighting instruction nor the chime ringing instruction to the car control device 200B which controls the assigned car 250B but sends only the "car responding instruction", and makes the car 250B respond to the floor to which the destination floor call is registered (S10).

In the examples of FIGS. 2 and 4, when the disabled person button 102 is pressed at the time of inputting the destination floor, the hall lantern corresponding to the assigned car is turned on, and the chime corresponding to the assigned car is rung. However, either of the hall lantern and the chime can be operated. Namely, the following is the case.

(In Case of Ringing the Chime)

A case will be explained in which only the chime sound is generated. The elevator system includes the chime as the notifying device, and the hall lantern is not necessarily provided. In this case, the disabled person button 102 is provided for the visually impaired person's use. At the time of inputting the destination floor, when the disabled person button 102 for the visually impaired person's use is pressed, only the chime is operated. The contents of the operation are the same as the one of FIG. 4.

(In Case of Lighting the Hall Lantern)

A case will be explained in which only the hall lantern is lit. The elevator system includes the hall lantern as the notifying device, and the chime is not necessarily provided. In this case, the disabled person button 102 is provided for the hearing impaired person's use. At the time of inputting the destination floor, when the disabled person button 102 of the hearing impaired person's use is pressed, only the hall lantern is operated. Here, the notifying device for notifying the hearing impaired person is not limited to the hall lantern, but it can be a display device (a liquid crystal display, for example) provided corresponding to the car for displaying predetermined information as a notice. For example, if the third floor is inputted as the destination floor, the display device shows the display such as "the car for the third floor is arriving" as the predetermined information.

FIG. 5 is a flowchart showing a case in which announcement is done for the visually impaired person. The respective car control devices include speakers 600A and 600B for announcement as shown in FIG. 2. Further, the elevator-hall-cal/destination-floor-call registration device 100A includes a speaker 104 for announcement. To facilitate the use by the visually impaired person, when the disabled person button 102 is pressed (S11), the display circuit unit 130 displays the destination floor inputted by the destination floor registration button 101, and at the same time makes announcement of the inputted destination floor via the speaker 104 (S12). Further, when the car assignment determining unit 322 determines the assigned car (S13), the car assignment determining unit 322 displays the assigned car number on the display unit 103 via the display circuit unit 130, and at the same time makes announcement of the assigned car number via the speaker 600B (when the car 250B is determined to be assigned) (S14), and in addition, turns on the hall lantern and rings the chime of the corresponding car (S15). Here, the car assignment determining unit 322, when the car which responds (S16) arrives at the elevator hall, can make announcement of the number of the corresponding car via the speaker 600B (S17).

By the elevator system 1000 according to the first embodiment, when the disabled person makes a call, the hall lantern of the car to ride is turned on, and the chime of the car to ride is rung. Because of this, the disabled person can easily find the car to ride and can move to the car to ride smoothly. The elevator system 1000 turns on the hall lantern only when the disabled person button 102 is pressed, so that electrical capacity for lighting the hall lantern can be saved.

In the foregoing embodiment, the elevator system has been explained, in which the elevator-hall-call/destination-floor-call registration device including the disabled person button;

the group management control device calculating the evaluated value of each car and selecting the optimal car to be assigned;

the car control device controlling each car;

the chime corresponding to each car; and the hall lantern corresponding to each car are included, and when the disabled person button of the elevator-hall-call/destination-floor-call registration device is pressed and as well the destination floor call is registered, of the assigned car, the chime is rung and further the hall lantern is turned on.

In the foregoing embodiment, the elevator system has been explained, in which when the disabled person button is pressed and as well the destination floor call is registered, only the chime of the assigned car is rung.

In the foregoing embodiment, the elevator system has been explained, in which when the disabled person button is pressed and as well the destination floor call is registered, only the hall lantern of the assigned car is turned on.

BRIEF EXPLANATION OF THE DRAWINGS

FIG. 5 is a flowchart in which guidance by announcement is added to the flowchart of FIG. 4.

Figure 1:
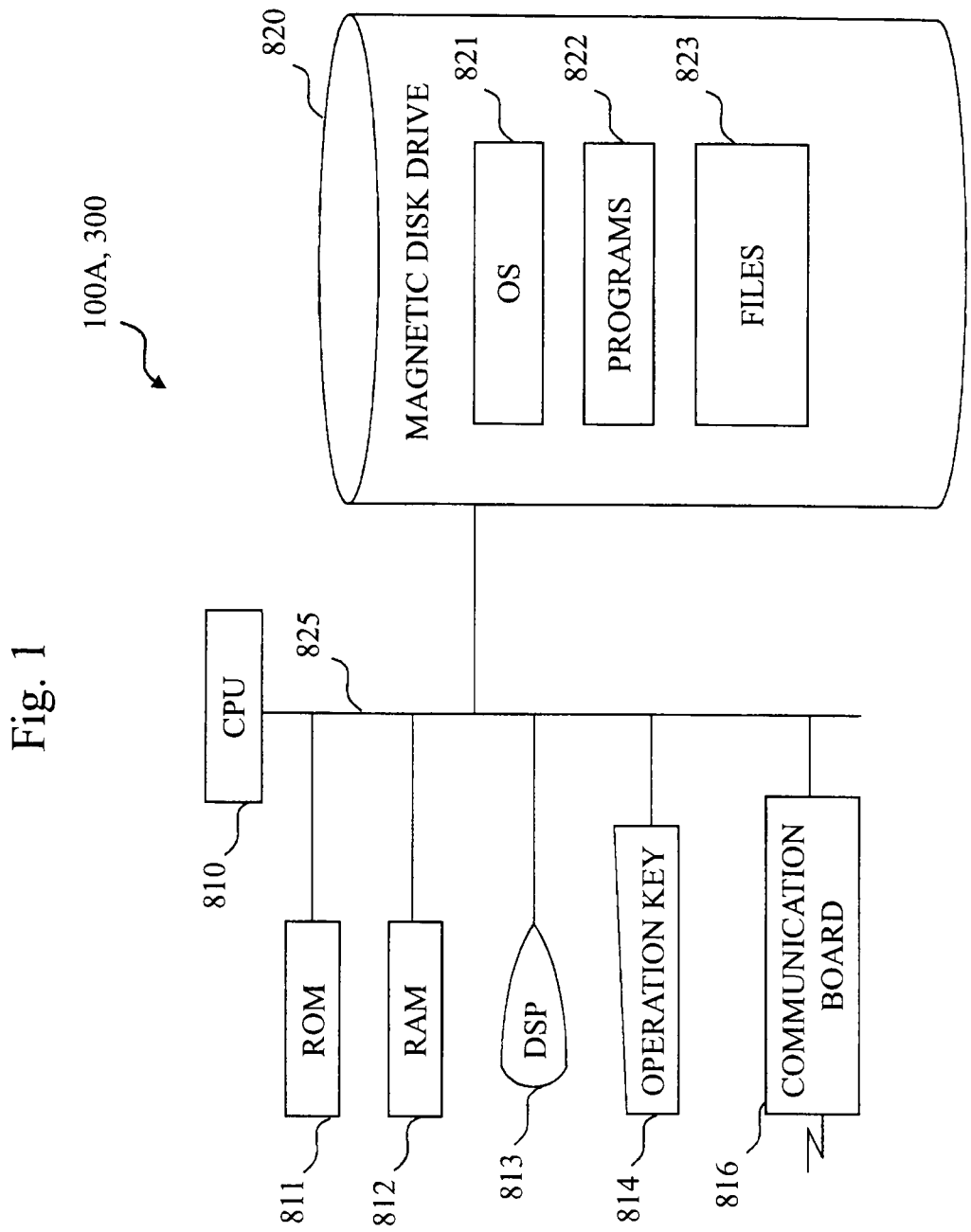
FIG. 1 is a diagram showing an example of hardware resource of an elevator-hall-call/destination-floor-call registration device 100A or a group management control device 300 according to the first embodiment.
Figure 2:
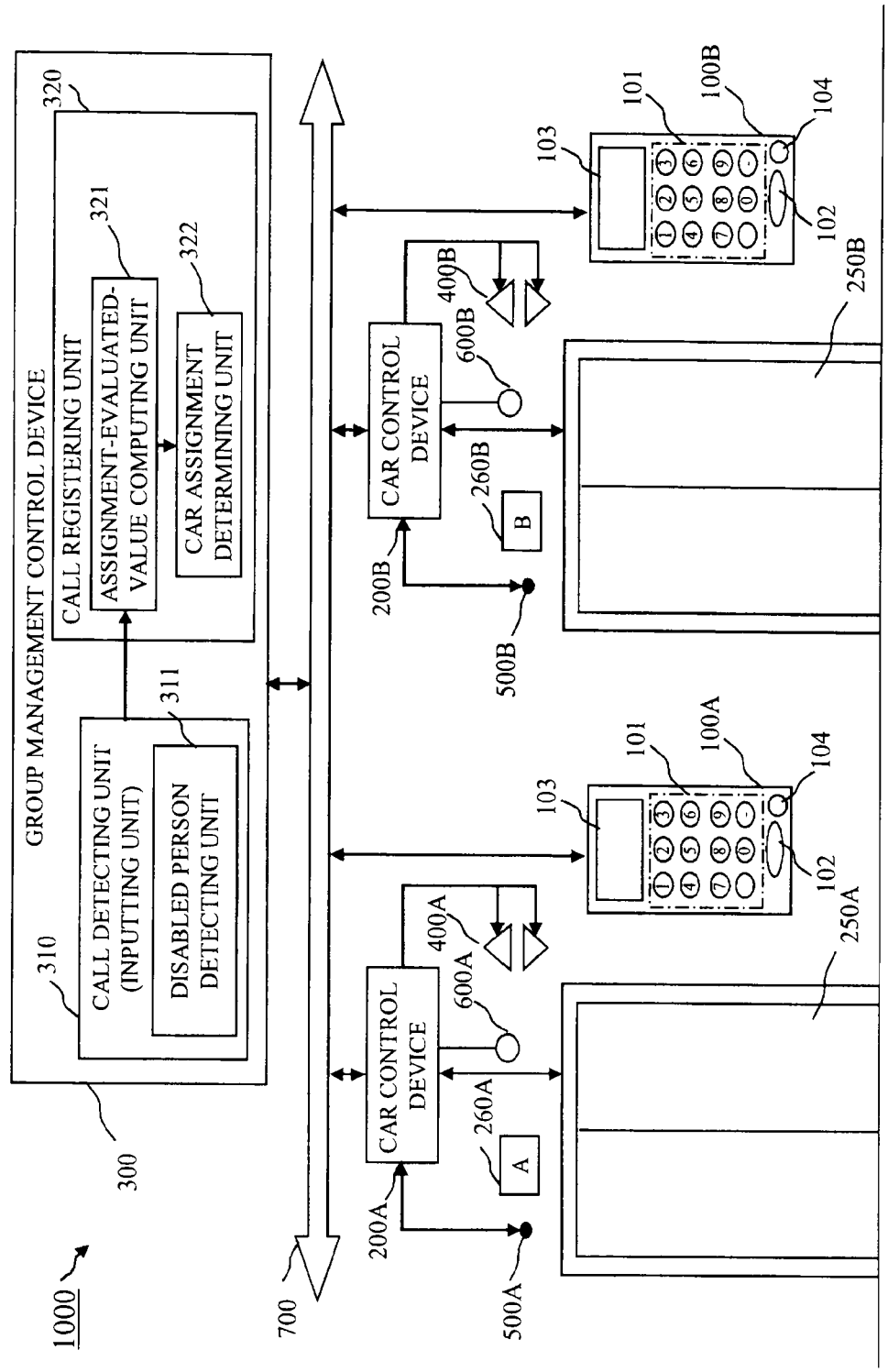
FIG. 2 shows a system configuration of an elevator system 1000 according to the first embodiment.
Figure 3:
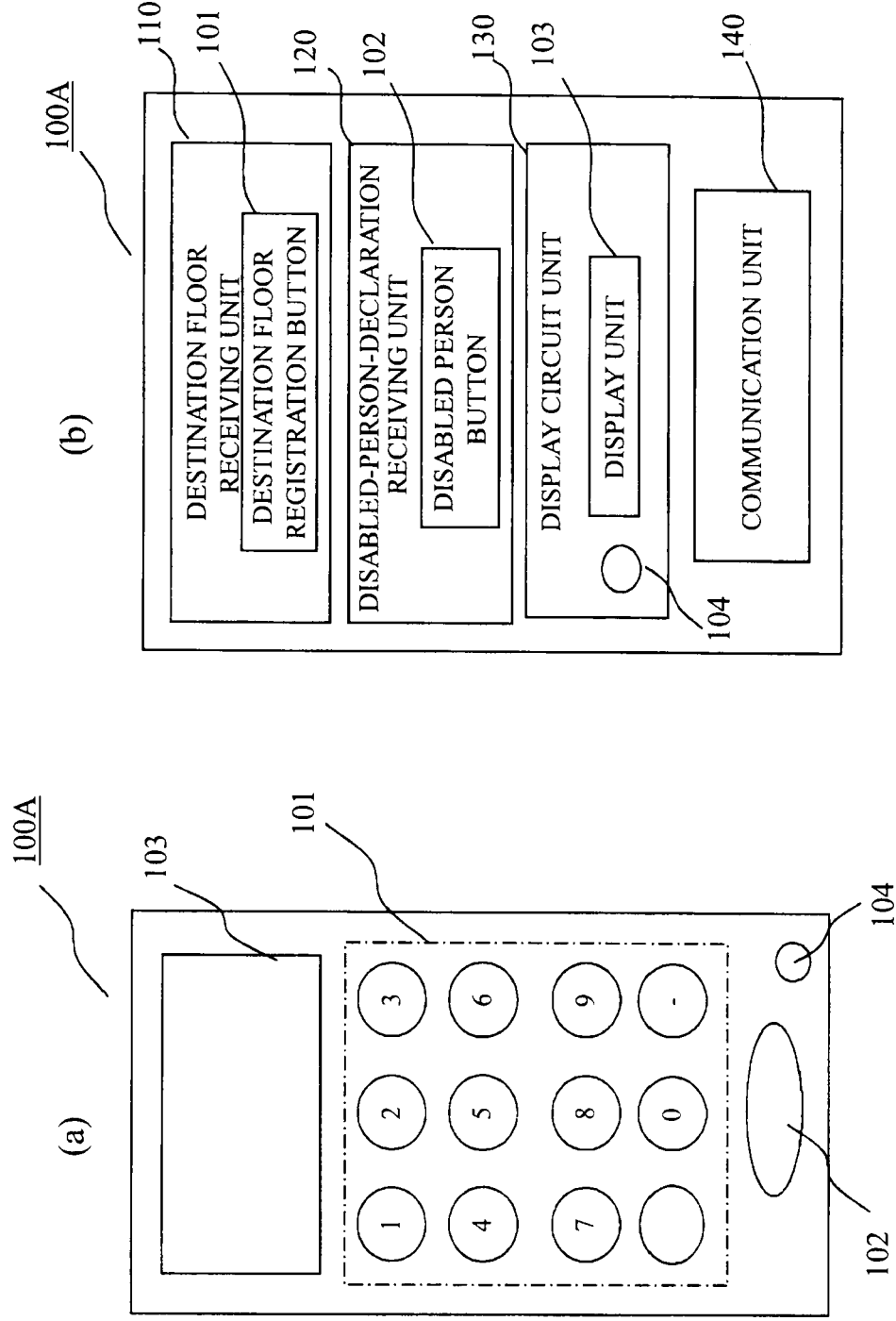
FIG. 3 shows an outer appearance and configuration of the elevator-hall-call/destination-floor-call registration device 100A according to the first embodiment.
Figure 4:
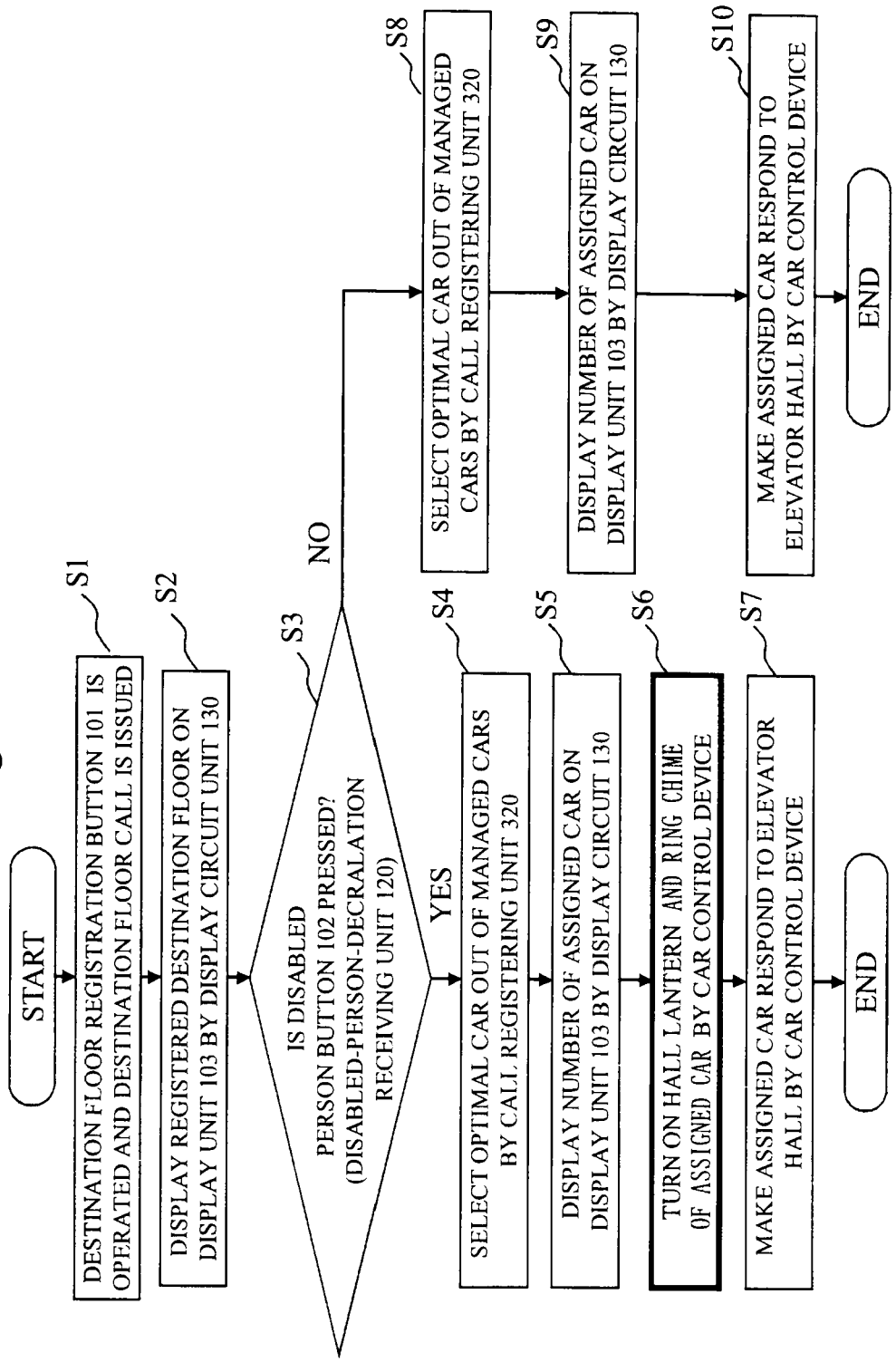
FIG. 4 is a flowchart showing the process of the elevator system 1000 according to the first embodiment.

EXPLANATION OF SIGNS 100A, 100B: an elevator-hall-call/destination-floor-call registration device; 110: a destination floor receiving unit; 101: a destination floor registration button; 120: a disabled-person-declaration receiving unit; 102: a disabled person button; 130: a display circuit unit; 103: a display unit; 104: a speaker; 140: a communication unit; 200A, 200B: a car control device; 250A, 250B: a car; 260A, 260B: a car number display plate; 300: a group management control device; 310: a call detecting unit; 311: a disabled person detecting unit; 320: a call registering unit; 321: an assignment-evaluated-value computing unit; 322: a car assignment determining unit; 400A, 400B: a hall lantern; 500A, 500B: a chime; 600A, 600B: a speaker; 700: a network; and 1000: an elevator system.

The invention claimed is:

1. An elevator system comprising:
a call receiving device provided at an elevator hall having a destination floor receiving unit receiving a destination floor call for an elevator and a disabled-person-declaration receiving unit, when operated, receiving a declaration of being a disabled person and outputting a disabled person signal showing to be the disabled person; and
a group management control device registering the destination floor call received by the destination floor receiving unit, and as well, if the disabled person signal is outputted by the disabled-person-declaration receiving unit when the destination floor call is received by the destination floor receiving unit, the group management control device determines an elevator car to be assigned for the destination floor call registered out of a plurality of elevator cars,
wherein the group management control device operates a notifying device for notifying of a determined assignment of the elevator car provided that corresponds to a door of the elevator car determined at an elevator hall side, which is the door of the elevator hall at the elevator hall side at which the call receiving device is provided,
wherein when the destination floor call is received by the destination floor receiving unit, and if the disabled person signal is outputted by the disabled-person-declaration receiving unit, the group management control device determines the elevator car to be assigned for the destination floor call, and
wherein the plurality of elevator cars are separated into a group of cars that can be used for a disabled person, and a group of cars for able-bodied persons, wherein the elevator to be assigned is selected from the group of cars that can be used for a disabled person.

2. The elevator system of claim 1, wherein the notifying device is a sound generating device generating predetermined sound as the notice.

3. The elevator system of claim 1, wherein the notifying device is a light emitting device emitting light as the notice.

4. The elevator system of claim 1, wherein the notifying device is a display device displaying predetermined information as the notice.

5. A group management control device comprising:
an inputting unit inputting a destination floor call and a disabled person signal from a call receiving device provided at an elevator hall, and the inputting unit having a destination floor receiving unit receiving and outputting the destination floor call for an elevator, and a disabled-person-declaration receiving unit, when operated, receiving a declaration of being a disabled person and outputting the disabled person signal indicating an elevator request by a disabled person; and
a call registering unit registering the destination floor call inputted by the inputting unit, and as well, if the disabled person signal is inputted when the destination floor call is inputted, determining an elevator car to be assigned for the destination floor call registered out of a plurality of elevator cars, and the call registering unit further operating a notifying device for notifying of a determined assignment of the elevator car provided that corresponds to a door of the elevator car determined at an elevator hall side, which is the door of the elevator hall at the elevator hall side at which the call receiving device is provided,
wherein the plurality of elevator cars are separated into a group of cars that can be used for a disabled person, and a group of cars for able-bodied persons, wherein the elevator to be assigned is selected from the group of cars that can be used for a disabled person.

6. An elevator system comprising:
a call receiving device provided at an elevator hall having a destination floor receiving unit receiving a destination floor call for an elevator, a disabled-person-declaration receiving unit, when operated, receiving a declaration of being a disabled person and outputting a disabled person signal showing to be the disabled person, and a display unit; and
a group management control device registering the destination floor call received by the destination floor receiving unit, and as well, if the disabled person signal is outputted by the disabled-person-declaration receiving unit when the destination floor call is received by the destination floor receiving unit, determining an elevator car to be assigned for the destination floor call registered out of a plurality of elevator cars, and further lighting a hall lantern notifying of a determined assignment of the elevator car provided corresponding to a door of the elevator car determined at an elevator hall side, which is the door of the elevator hall at the elevator hall side at which the call receiving device is provided, and wherein the group management control device lights the hall lantern only when the disabled person signal is outputted by the disabled-person-declaration receiving unit;

wherein the group management control device, when the destination floor call is received by the destination floor receiving unit, registers the destination floor call regardless of whether the disabled person signal is outputted or not, and as well determines the elevator car to be assigned for the destination floor call registered out of the plurality of elevator cars, and wherein the call receiving device, when the elevator car is determined by the group management control device, displays a number of the elevator car determined on the display unit.

* * * * *